(12) United States Patent
Xiong et al.

(10) Patent No.: US 12,160,906 B2
(45) Date of Patent: Dec. 3, 2024

(54) METHODS AND DEVICES FOR UPLINK SIGNAL TRANSMISSION

(71) Applicant: Samsung Electronics Co., Ltd., Gyeonggi-do (KR)

(72) Inventors: Qi Xiong, Beijing (CN); Feifei Sun, Beijing (CN); Bin Yu, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/451,380

(22) Filed: Aug. 17, 2023

(65) Prior Publication Data

US 2023/0397263 A1 Dec. 7, 2023

Related U.S. Application Data

(63) Continuation of application No. 17/394,809, filed on Aug. 5, 2021, now Pat. No. 11,778,670.

(30) Foreign Application Priority Data

Aug. 5, 2020 (CN) .......................... 202010779682.6

(51) Int. Cl.
| | |
|---|---|
| *H04W 74/08* | (2024.01) |
| *H04W 72/0446* | (2023.01) |
| *H04W 72/0453* | (2023.01) |
| *H04W 74/00* | (2009.01) |
| *H04W 74/0833* | (2024.01) |

(52) U.S. Cl.
CPC ... *H04W 74/0841* (2013.01); *H04W 72/0446* (2013.01); *H04W 72/0453* (2013.01); *H04W 74/002* (2013.01); *H04W 74/0891* (2013.01)

(58) Field of Classification Search
CPC ......... H04W 72/0446; H04W 72/0453; H04W 74/006; H04W 74/008; H04W 74/0833; H04W 74/0841; H04W 74/0891
USPC ....................................................... 370/329
See application file for complete search history.

(56) References Cited

U.S. PATENT DOCUMENTS

| | | | |
|---|---|---|---|
| 10,531,311 | B2 | 1/2020 | Huang et al. |
| 11,729,795 | B2 | 8/2023 | Liu et al. |

(Continued)

FOREIGN PATENT DOCUMENTS

| | | |
|---|---|---|
| CN | 106804043 | 6/2017 |
| CN | 108419300 | 8/2018 |

(Continued)

OTHER PUBLICATIONS

International Search Report dated Dec. 1, 2021 issued in counterpart application No. PCT/KR2021/010341, 8 pages.

(Continued)

*Primary Examiner* — Robert J Lopata

(74) *Attorney, Agent, or Firm* — The Farrell Law Firm, P.C.

(57) ABSTRACT

The disclosure provides methods and devices for confirming the resource configuration of uplink signal transmission. The method includes receiving, from a base station (BS), a synchronization signal and physical broadcasting channel (PBCH) block (SSB); receiving, from the BS, information configuring a physical random access channel (PRACH) occasion; and transmitting, to the BS, an uplink signal on a resource set associated with the SSB.

24 Claims, 12 Drawing Sheets

(56) References Cited

U.S. PATENT DOCUMENTS

| | | | |
|---|---|---|---|
| 2012/0320842 A1* | 12/2012 | Jeong | H04W 74/006 |
| | | | 370/329 |
| 2016/0007377 A1 | 1/2016 | Frenne et al. | |
| 2018/0176957 A1 | 6/2018 | Zhang et al. | |
| 2019/0110314 A1 | 4/2019 | Abedini et al. | |
| 2019/0335510 A1 | 10/2019 | Ling et al. | |
| 2020/0008247 A1* | 1/2020 | Kwak | H04B 7/0695 |
| 2020/0146034 A1* | 5/2020 | Bagheri | H04W 72/1268 |
| 2020/0186308 A1 | 6/2020 | Yan et al. | |
| 2020/0221510 A1 | 7/2020 | Ko et al. | |
| 2020/0236716 A1* | 7/2020 | Lei | H04L 5/0044 |
| 2021/0266970 A1* | 8/2021 | Lei | H04W 48/14 |
| 2021/0289536 A1* | 9/2021 | Liu | H04W 74/0841 |
| 2021/0307078 A1* | 9/2021 | Singh | H04L 5/0048 |
| 2021/0352692 A1* | 11/2021 | Lei | H04W 76/28 |
| 2021/0360702 A1* | 11/2021 | Jang | H04W 36/0072 |
| 2022/0046713 A1* | 2/2022 | Park | H04W 74/008 |
| 2022/0124831 A1* | 4/2022 | Taherzadeh Boroujeni | |
| | | | H04W 74/0841 |
| 2022/0210844 A1* | 6/2022 | MolavianJazi | H04L 5/0053 |
| 2022/0330068 A1* | 10/2022 | Yuan | H04B 7/063 |
| 2023/0156807 A1* | 5/2023 | Lei | H04W 72/12 |
| | | | 370/329 |
| 2023/0164846 A1* | 5/2023 | Duan | H04W 74/0833 |
| | | | 370/329 |

FOREIGN PATENT DOCUMENTS

| | | |
|---|---|---|
| CN | 109475001 | 3/2019 |
| CN | 109587814 | 4/2019 |
| JP | 2020-014080 | 1/2020 |
| WO | WO 2019/050316 | 3/2019 |
| WO | WO 2019/214474 | 11/2019 |
| WO | WO 2020/032618 | 2/2020 |
| WO | WO 2020/067950 | 4/2020 |

OTHER PUBLICATIONS

3GPP TS 38.213 V16.0.0 (Dec. 2019) 3rd Generation Partnership Project; Technical Specification Group Radio Access Network; NR; Physical Layer Procedures for Control, Release 16, pp. 146.

European Search Report dated Apr. 12, 2024 issued in counterpart application No. 24157706.3-1215, 8 pages.

European Search Report dated Oct. 18, 2023 issued in counterpart application No. 21852870.1-1215, 8 pages.

Vivo, "Discussion on Initial Access Signals and Channels", R1-1910201, 3GPP TSG RAN WG1 #98bis, Oct. 14-20, 2019, 13 pages.

Chinese Office Action dated May 8, 2024 issued in counterpart application No. 202010779682.6, 22 pages.

Chinese Office Action dated Oct. 17, 2024 issued in counterpart application No. 202010779682.6, 7 pages.

* cited by examiner

| RO 0 Preamble 4 | RO 1 Preamble 4 | RO 2 Preamble 4 |
|---|---|---|

RO bundle (the bundle size is 3)
(a) same preambles

| RO 0 Preamble 4 | RO 1 Preamble 5 | RO 2 Preamble 7 |
|---|---|---|

RO bundle (the bundle size is 3)
(b) different preambles

FIG.8

METHODS AND DEVICES FOR UPLINK SIGNAL TRANSMISSION

CROSS-REFERENCE TO RELATED APPLICATION(S)

This application is a Continuation of U.S. application Ser. No. 17/394,809, which was filed in the U.S. Patent and Trademark Office on Aug. 5, 2021, and claims priority under 35 U.S.C. § 119 to Chinese Patent Application No. 202010779682.6, which was filed in the Chinese Intellectual Property Office on Aug. 5, 2020, the entire disclosure of each of which is incorporated herein by reference.

BACKGROUND

1. Field

The disclosure relates to the field of wireless communication, and more particularly to methods and devices for uplink signal transmission.

2. Description of the Related Art

In order to meet the increasing demand for wireless data communication services since the deployment of 4G communication systems, efforts have been made to develop improved 5G or pre-5G communication systems. 5G or pre-5G communication systems are also called "beyond 4G networks" or "post-LTE systems".

In order to achieve a higher data rate, 5G communication systems are implemented in higher frequency (mmWave) bands, e.g., 60 GHz bands. In order to reduce propagation loss of radio waves and increase a transmission distance, technologies such as beamforming, massive multiple-input multiple-output (mMIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid frequency shift keying (FSK) and quadrature amplitude modulation (FQAM) and sliding window superposition coding (SWSC) as advanced coding modulation (ACM), and filter bank multicarrier (FBMC), non-orthogonal multiple access (NOMA) and sparse code multiple access (SCMA), as advanced access technologies have been developed.

SUMMARY

Aspects of the disclosure are to address at least the above-mentioned problems and/or disadvantages, and to provide at least the advantages described below.

Therefore, various aspects of the disclosure provide a method and a device for confirming the resource configuration of uplink signal transmission. The method and device for confirming the resource configuration of uplink signal transmission according to various aspects of the disclosure can enable a user equipment (UE) to use multiple transmit beams to perform random access signal transmission in a uplink transmission procedure, and obtain repetitive signal transmission to achieve the effect of coverage enhancement and better beam management for multiple transmit beams.

According to an aspect of the disclosure, there is provided a UE in a wireless communication system. the UE includes a transceiver; and a controller coupled with the transceiver, and configured to receive, from a base station (BS), a synchronization signal and physical broadcasting channel (PBCH) block (SSB), receive, from the BS, information configuring a physical random access channel (PRACH) occasion, and transmit, to the BS, an uplink signal on a resource set associated with the SSB.

According to another aspect of the disclosure, there is provided a BS in a wireless communication system. The BS includes a transceiver; and a controller coupled with the transceiver, and configured to transmit, to a UE, an SSB, transmit, to the UE, information configuring a PRACH occasion, and receive, from the UE, an uplink signal on a resource set associated with the SSB.

According to another aspect of the disclosure, a method performed by a UE in a wireless communication system is provided. The method includes receiving, from a BS, an SSB; receiving, from the BS, information configuring a PRACH occasion; and transmitting, to the BS, an uplink signal on a resource set associated with the SSB.

According to another aspect of the disclosure, a method performed by a BS in a wireless communication system is provided. The method includes transmitting, to a UE, an SSB; transmitting, to the UE, information configuring a PRACH occasion; and receiving, from the UE, an uplink signal on a resource set associated with the SSB.

BRIEF DESCRIPTION OF THE DRAWINGS

The above and other objects, features, and advantages of the disclosure will be more apparent from the following description of embodiments of the disclosure with reference to the accompanying drawings, in which:

FIG. 8 illustrates an example of transmitting a preamble in a PRACH transmission occasion bundle according to an embodiment;

DETAILED DESCRIPTION

Figure 1:
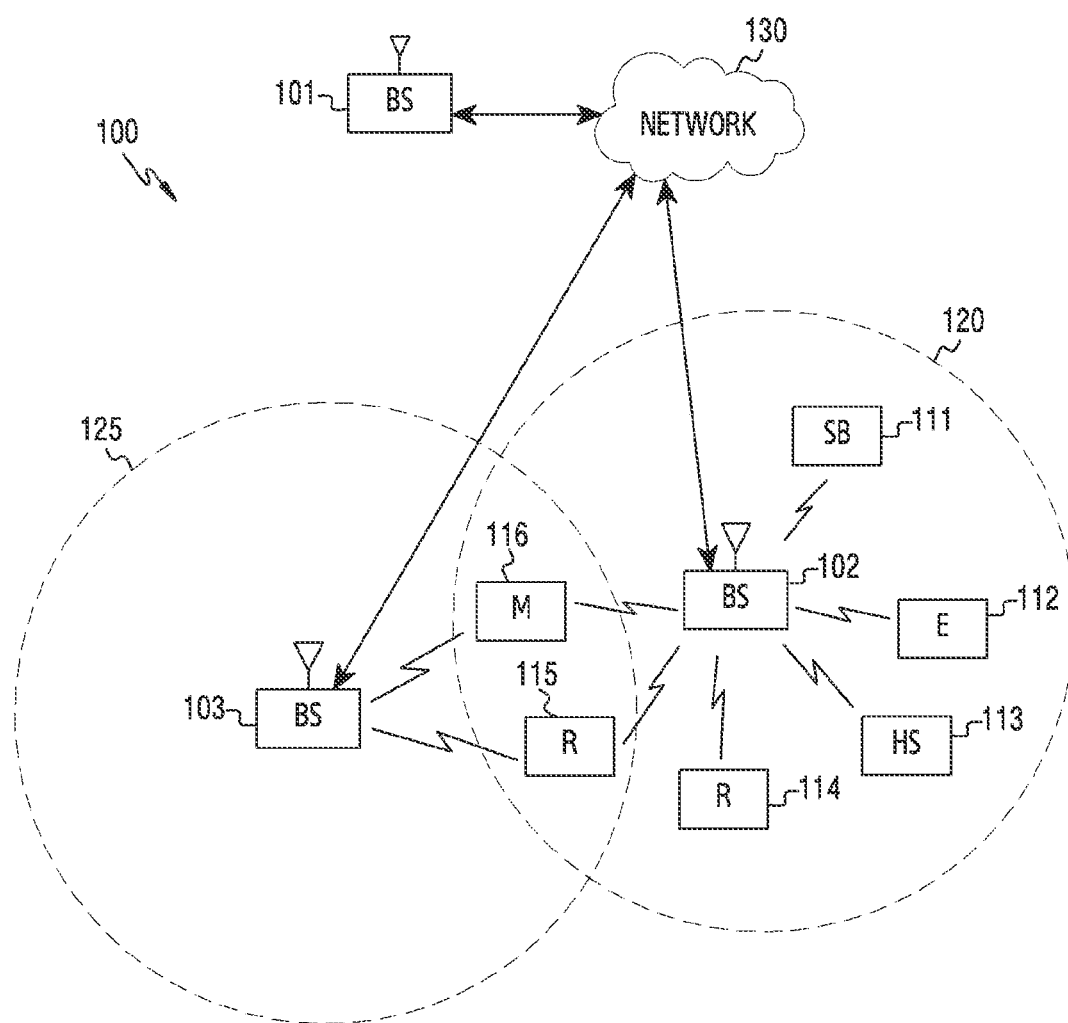
FIG. 1 illustrates an example wireless network according to an embodiment.

The text and drawings are provided as examples only to help readers understand the disclosure. They are not intended and should not be interpreted as limiting the scope of the disclosure in any way. Although certain embodiments and examples have been provided, based on the content disclosed herein, it is obvious to those skilled in the art that modifications to the illustrated embodiments and examples can be made without departing from the scope of the disclosure.

Those skilled in the art will understand that the singular forms "a", "an", "said" and "the" used herein may include plural forms, unless otherwise specified. It should be further understood that the term "include/comprise" used in the specification of the disclosure refers to the existence of the described features, integers, steps, operations, elements and/or components, but does not exclude the existence or addition of one or more other features, integers, steps, operations, elements, components, and/or groups thereof. It should be understood that when an element is referred to as being "connected" or "coupled" to another element, it may be directly connected or coupled to the other element, or intervening elements may also be present. Furthermore, "connected" or "coupled" as used herein may include wirelessly connected or wirelessly coupled. As used herein, the term "and/or" includes all or any of the units and all combinations of one or more of the associated listed items.

Those skilled in the art will understand that, unless otherwise defined, all terms (including technical and scientific terms) used herein have the same meaning as generally understood by an ordinary person skilled in the art to which the disclosure belongs. It should be further understood that such terms as those defined in a generally used dictionary are to be interpreted to have the same contextual meanings as normally understood in the relevant field of art, and are not to be interpreted to have ideal or overly formal meanings unless clearly defined in the present specification.

Those skilled in the art will understand that "terminal" and "terminal device" used herein include both wireless signal receiver devices, which only have wireless signal receivers without transmission capability; and devices having receiver and transmitter hardware, which include receiver and transmitter hardware capable of performing bidirectional communication on a bidirectional communication link. Such devices may include cellular or other communication devices with single-line or multi-line displays, or cellular or other communication devices without multi-line displays; personal communications service (PCS), which may combine voice, data processing, fax and/or data communication capabilities; personal digital assistant (PDA), which may include radio frequency receivers, pagers, internet/intranet access, web browsers, notepads, calendars and/or global positioning system (GPS) receiver; conventional laptop and/or palmtop computer or other devices, which have and/or include a radio frequency receiver. "Terminal" and "terminal device" used herein may be portable, transportable, installed in transportation means (aircraft, ship, and/or vehicle), or suitable and/or configured for operation locally, and/or operated in a distributed manner on any other location on Earth and/or in space. "Terminal" and "terminal device" used herein may also be communication terminals, Internet terminals, music/video playback terminals, such as PDA, mobile internet device (MID), and/or mobile phones with music/video playback function, and may also be smart TVs, set-top boxes and other devices.

Those skilled in the art can understand that the "base station" (BS) or "network device" used herein may refer to an eNB, an eNodeB, a NodeB, or a base station transceiver (BTS) or a gNB, etc. according to the technology and terminology used.

Those skilled in the art will understand that the "memory" used herein may be of any type suitable for the technical environment herein, and may be implemented using any suitable data storage technology, including but not limited to, semiconductor-based storage devices, magnetic storage devices and systems, optical storage devices and systems, fixed and removable storages.

Those skilled in the art will understand that the "processor" used herein may be of any type suitable for the technical environment herein, including but not limited to, one or more of general purpose computers, special purpose computers, microprocessors, digital signal processors (DSPs), and multi-core-architectures based processors.

The time domain unit (also referred to as a time unit) in this disclosure may be an OFDM symbol, a set of OFDM symbols (consisting of multiple OFDM symbols), a slot, a set of slots (consisting of multiple slots), a subframe, a set of subframes (consisting of multiple subframes), a system frame, and a set of system frames (consisting of multiple system frames). The time unit may also be an absolute time unit, such as 1 millisecond, 1 second, and the like. The time unit may also be a combination of multiple granularities, such as N1 slots plus N2 OFDM symbols.

The frequency domain unit in this disclosure may be a subcarrier, a subcarrier group (consisting of multiple subcarriers), a resource block (RB), which may also be referred to as physical resource block (PRB), a resource block group (consisting of multiple RBs), a bandwidth part (BWP), a bandwidth part group (consisting of multiple BWPs), a band/carrier, and a band group/carrier group. The frequency domain unit may also be absolute frequency domain units, such as 1 Hz, 1 kHz, and the like. The frequency domain unit may also be a combination of multiple granularities, such as M1 PRBs plus M2 subcarriers.

Hereinafter, embodiments according to the disclosure will be described in detail with reference to the accompanying drawings.

FIG. 1 illustrates an example wireless network 100 according to an embodiment. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used herein to refer to network infrastructure components that provide wireless access for remote terminals. Further, depending on the type of the network, other well-known terms such as "mobile station", "user station", "remote terminal", "wireless terminal" or "user apparatus" can be used instead of "user equipment" or "UE". For convenience, the terms "user equipment" and "UE" are used herein to refer to remote wireless devices that wirelessly access the gNB, no matter whether the UE is a mobile device (such as a mobile phone or a smart phone) or a device considered generally as being stationary (such as a desktop computer or a vending machine).

gNB 102 provides wireless broadband access to the network 130 for a first plurality of UEs within a coverage area 120 of gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cellular phone, a wireless laptop computer, a wireless PDA, etc. gNB 103 provides wireless broadband access to network 130 for a second plurality of UEs within a coverage area 125 of gNB 103. The second plurality of UEs includes a UE 115 and a UE 116. In some embodiments, one or more of gNBs 101-103 can communicate with each other and with UEs 111-116 using 5G, long term evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described herein. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each of gNBs 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
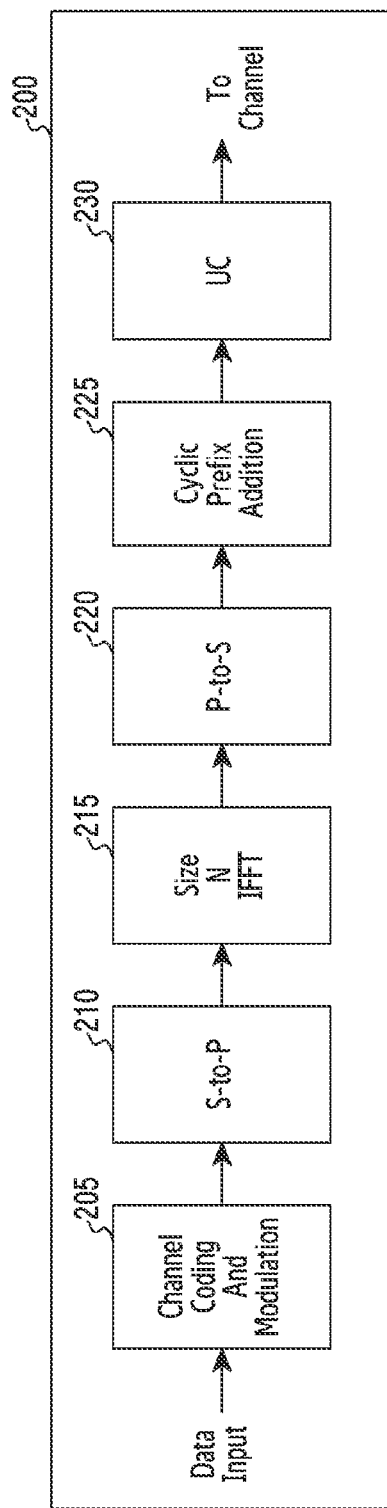
FIG. 2A illustrates an example wireless transmission path according to an embodiment.
Figure 2B:
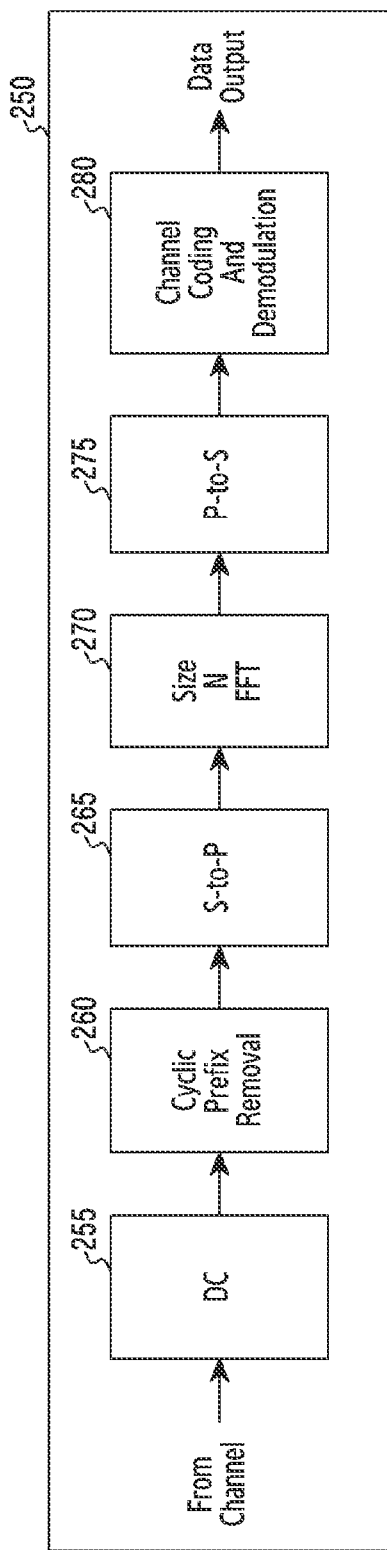
FIG. 2B illustrates an example wireless reception path according to an embodiment.

FIGS. 2A and 2B illustrate example wireless transmission and reception paths according to an embodiment. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described herein.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, an S-to-P block 265, a size N fast Fourier transform (FFT) block 270, a P-to-S block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or QAM) to generate a sequence of frequency-domain modulated symbols. The S-to-P block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The P-to-S block 220 converts (such as multiplexes) parallel time-domain output symbols from the size N IFFT block 215 to generate a serial time-domain signal. The cyclic prefix addition block 225 inserts a cyclic prefix into the time-domain signal. The UC 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The DC 255 down-converts the received signal to a baseband frequency, and the cyclic prefix removal block 260 removes the cyclic prefix to generate a serial time-domain baseband signal. The S-to-P block 265 converts the time-domain baseband signal into a parallel time-domain signal. The size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
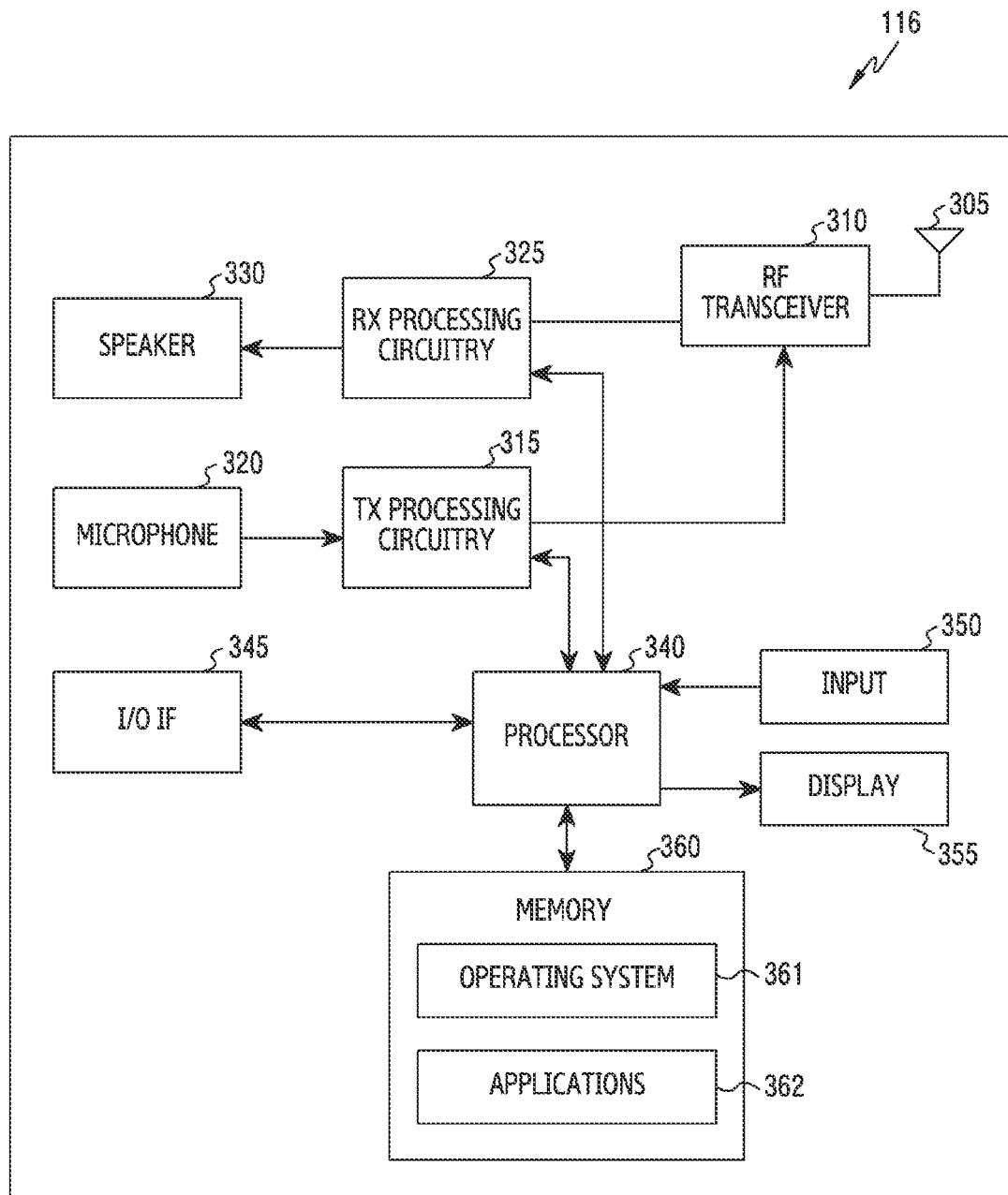
FIG. 3A illustrates an example UE according to an embodiment.

FIG. 3A illustrates an example UE 116 according to an embodiment. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to the speaker 330 (such as for voice data) or to the processor/controller 340 (such as for web browsing data) for further processing.

The TX processing circuit 315 receives analog or digital voice data from the microphone 320 or other outgoing baseband data (such as network data, email or interactive video game data) from the processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described herein. The processor/controller 340 can move data into or out of the memory 360 as required by an execution process. In some embodiments, the processor/controller 340 is configured to execute an application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or stationary devices.

Figure 3B:
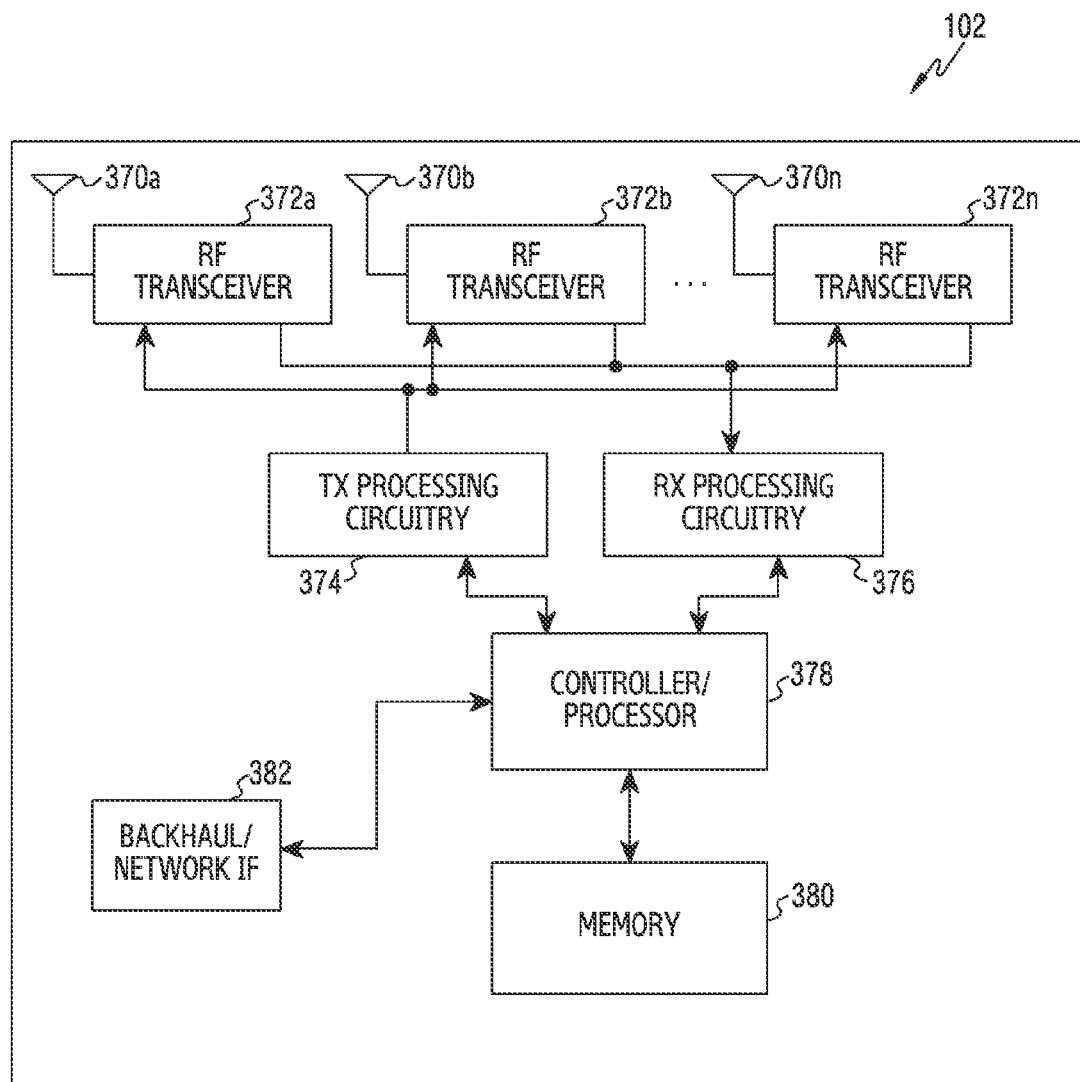
FIG. 3B illustrates an example gNB according to an embodiment.

FIG. 3B illustrates an example gNB 102 according to an embodiment. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. The RX processing circuit 376 transmits the processed baseband signal to the controller/processor 378 for further processing.

The TX processing circuit 374 receives analog or digital data (such as voice data, web data, email or interactive video game data) from the controller/processor 378. The TX processing circuit 374 encodes, multiplexes and/or digitizes outgoing baseband data to generate a processed baseband or IF signal. The RF transceivers 372a-372n receive the outgoing processed baseband or IF signal from the TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. The controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described herein. In some embodiments, the controller/processor 378 supports communication between entities such as web real-time communications (RTCs). The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using the RF transceivers 372a-372n, the TX processing circuit 374 and/or the RX processing circuit 376) support aggregated communication with frequency division duplex (FDD) cells and time division duplex (TDD) cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Figure 4:
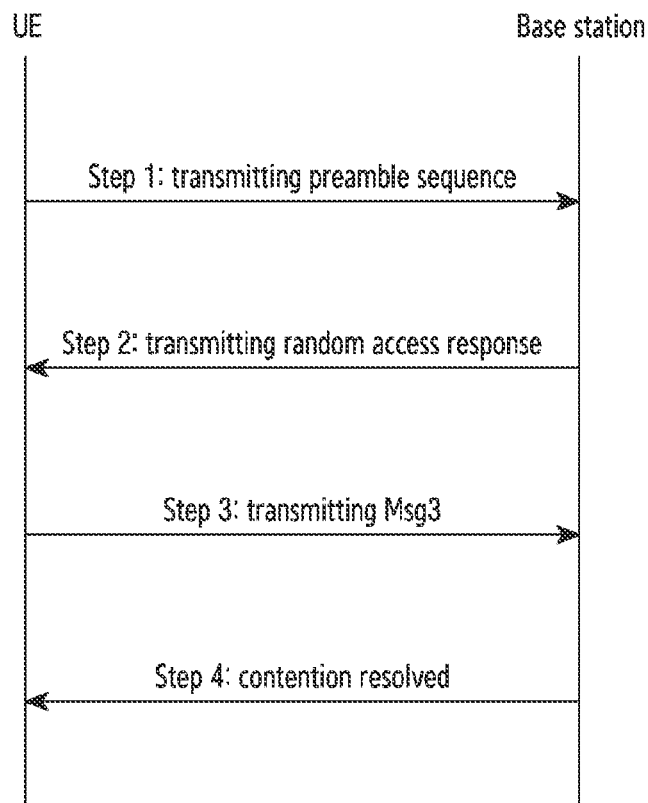
FIG. 4 illustrates a contention-based random access procedure according to an embodiment.

FIG. 4 illustrates a contention-based random access procedure according to an embodiment.

Transmission in a wireless communication system includes transmission from a base station (gNB) to a user equipment (UE) (referred to as downlink transmission), the slot corresponding to which is called a downlink slot; and transmission from the UE to the base station (referred to as uplink transmission), the slot corresponding to which is called an uplink slot.

In the downlink communication of the wireless communication system, the system periodically transmits synchronization signals and broadcast channels to the UE via a synchronization signal block (SSB/PBCH block), the periodicity of which is a synchronization signal block (SSB) periodicity, or may be called an SSB burst periodicity. At the same time, the base station may configure a physical random access channel (PRACH) configuration period, during which a certain number of random access transmission occasions (also called random access occasions, PRACH transmission occasions, ROs) are configured, which satisfy that all SSBs can be mapped to the corresponding RO within a mapping period (having a certain duration).

In a new radio (NR) communication system, before radio resource control (RRC) is established, such as during the random access procedure, the performance of random access directly affects the user experience. In conventional wireless communication systems, such as LTE and LTE-Advanced, the random access procedure is applied in multiple scenarios, such as initial connections establishment, cell handover, uplinks re-establishment, and RRC connection re-establishment, etc.; and divided into contention-based random access and contention-free random access depending on whether the UE occupies the preamble sequence resource exclusively or not. Since a preamble sequence is selected from the same preamble sequence resources during the attempt of establishment of an uplink connection by respective users in the contention-based random access, it may be possible for a plurality of UEs to select the same preamble sequence to be transmitted to the base station. Hence, a contention resolution mechanism becomes an important research direction of random access. How to reduce the contention probability and how to rapidly resolve contentions that have already taken place are key indicators that influence the performance of random access.

The contention-based random access procedure in LTE-A consists of four steps, as shown in FIG. 4. In the first step, a UE randomly selects a preamble sequence from a preamble sequence resource pool and transmits it to the base station. The base station performs correlation detection on the received signals to identify the preamble sequence transmitted by the UE. In the second step, the base station transmits a random access response (RAR) to the UE, which includes a random access preamble sequence identifier, a timing advance indication determined according to a time delay estimation between the UE and the base station, a temporary cell-radio network temporary identifier (C-RNTI), and time-frequency resources allocated to the UE for a next uplink transmission. In the third step, the UE transmits a message 3 (Msg3) to the base station according to information in the RAR. The Msg3 includes information such as a user terminal identifier and RRC connection request etc., wherein the user terminal identifier is unique to the UE and used to resolve contentions. In the fourth step, the base station transmits a contention resolution identifier to the UE, including an identifier of the user terminal which is the winner of the contention resolution. The UE upgrades the temporary C-RNTI to a C-RNTI after detecting the identifier thereof, transmits an acknowledgement (ACK) signal to the base station to complete the random access procedure, and waits for the scheduling of the base station. Otherwise, the UE would start a new random access procedure after a period of time delay.

For a contention-free random access procedure, the base station may allocate a preamble sequence to the UE since it has known the identifier of the UE. Hence, upon transmitting the preamble sequence, the UE does not need to randomly select a sequence, and instead, the UE uses an allocated preamble sequence. The base station may transmit a corresponding random access response after detecting the allocated preamble sequence, and the random access response includes information such as timing advance and uplink resource allocation, etc. After receiving the RAR, the UE recognizes that uplink synchronization has been completed and waits for further scheduling of the base station. Therefore, the contention-free random access procedure includes only two steps: the first step is to transmit a preamble sequence; and the second step is to transmit an RAR.

The random access procedure in LTE is applicable to the following scenarios:
1. Initial access from RRC_IDLE;
2. RRC connection re-establishment procedure;
3. Cell handover;
4. Downlink data arrival during RRC_CONNECTED requiring random access procedure (when the uplink synchronization status is "non-synchronized");
5. Uplink data arrival during RRC_CONNECTED requiring random access procedure (when the uplink synchronization status is "non-synchronized", or there are no PUCCH resources allocated for the scheduling request); and
6. Positioning.

However, in systems that use beamforming and/or systems with limited coverage, in the initial access phase, the UE may eventually fail to access due to mobility or other reasons, e.g., fail to receive the random access signal transmitted by the user equipment; therefore, how to provide sufficient beamforming gain and/or provide sufficient coverage in the initial access procedure is a problem that needs to be solved.

Figure 5:
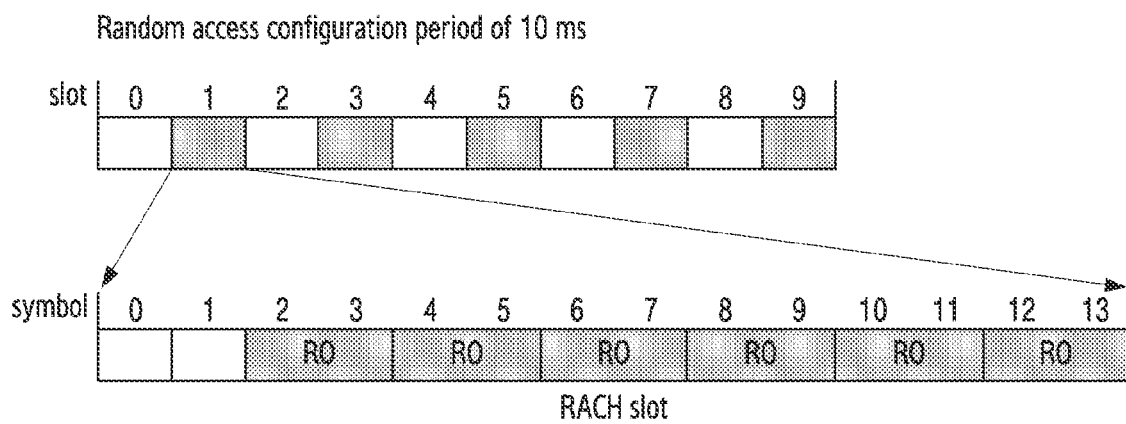
FIG. 5 illustrates an example configuration of a PRACH transmission occasion according to an embodiment.

FIG. 5 illustrates an example configuration of a PRACH transmission occasion according to an embodiment.

In particular, in this embodiment, a novel method for confirming the resource configuration of uplink signal transmission is described. In particular, in this embodiment, it is described that the UE uses the provided method to confirm the resource configuration for transmitting the random access signal, and to transmit the random access signal.

Generally, through the configuration information of the network device, the UE can obtain the configuration status of the PRACH transmission occasion, which includes at least one of the following:
Random access configuration period;
Position index of a RACH slot in a random access configuration period (RACH slot index), the RACH slot is a slot including at least one PRACH transmission occasion;
Starting symbol position of the PRACH transmission occasion included in a RACH slot, and the number of PRACH transmission occasions included; further, only the start symbol position of the first PRACH transmission occasion can be obtained, and then positions of other PRACH transmission occasions in the slot can be determined by time length of PRACH transmission occasion, the number of PRACH transmission occasions and PRACH transmission occasions within the slot being continuous.

The configuration information may be indicated by high-layer signaling (system information, or UE-specific configuration signaling) and/or DCI signaling.

Hereinafter, an embodiment will be described in detail with reference to FIG. 5. As shown in FIG. 5, for example, the random access configuration period is 10 ms, and slots 1, 3, 5, 7, and 9 are configured with PRACH transmission occasions; and there are 6 ROs in each RACH slot, the first RO starts from symbol 2, the time length of each RO is 2 OFDM symbols, then the UE can obtain a random occasion configuration as shown in FIG. 5.

The UE will continue to obtain a random access configuration, such as a PRACH transmission occasion bundle (RO bundle) configuration; that is, bundling multiple ROs together. When transmitting the random access signal, the UE transmits it in accordance with a RO bundle (that is, in the unit of RO bundle).

In particular, the RO bundle configuration includes at least one of the following:
Bundle size, that is, N ROs are bundled together as an RO bundle, wherein N is a positive integer (in particular, N can be equal to 1); preferably, N can be selected from a set of preferred values, for example, N can be one value selected from $\{1, 2, 3, 6, 7\}$, that is, a set of values composed in accordance with the number of ROs that may exist in a RACH slot; in particular, the value of N (or the value in the set of values) can include the maximum (max) value, such as $\{1, 2, 4, \text{max}\}$, wherein the max value is the maximum value of the number of the PRACH transmission occasions which can be included in a random access preamble format in a given network configuration within a RACH slot; in particular, the value of N can be the number of ROs included in a RACH slot in the time domain or the number of ROs that are frequency-divided at a same time;
Starting position of the bundling, that is, the starting position of an RO bundle, including a starting point in the time domain and/or a starting point in the frequency domain.

The starting position of the RO bundle can be determined as follows.
Starting point in the time domain of the first RO bundle within a period of time, which can be at least one of the following:
Start of the first time domain unit of system frame number 0, in particular, the first RO with system frame number 0 (SFN0) being the starting point;
First RO in a random access configuration period;
First RO in a PRACH slot;
First RO among the ROs to which a single SSB is mapped;
Starting point of an SSB to RO mapping cycle; in particular, a first RO in an SSB to RO mapping cycle;
Starting point of an SSB to RO association period; in particular, starting position of the first time domain unit of the first RO in an SSB to RO association period;
Starting point of an SSB to RO association pattern period; in particular, a first RO in an SSB to RO association pattern period.

The SSB in the above SSB to RO mapping is only an example, and can be replaced with other downlink signals that have a mapping relationship with RO, e.g. CSI-RS, etc.; and the above first RO can also be replaced with the starting position of the first time domain unit of the first RO.

The period of time may be an integer number of SFNs (for example, 2048 SFNs), a PRACH slot, a random access configuration period, each of the SSB-RO mapping, mapping cycle, association period, association pattern period, etc.

The starting point in the frequency domain of the first RO bundle within a period of time can be at least one of:
  Starting position of the first RO in the frequency domain within the period of time, in particular, the starting position of the first RO may be the starting position of the first frequency domain unit of the first RO;
  The period of time is as described above, that is, it may be an integer number of SFNs (for example, 2048 SFNs), a PRACH slot, a random access configuration period, each of the SSB-RO mapping, a mapping cycle, an association period, an association pattern period, etc.

After obtaining the starting position of the first RO within a period of time as described above, positions of other RO bundles within the period of time can be obtained in accordance with the following method:
  Positions of other RO bundles within the period of time are obtained based on the starting position of the first RO bundle and the size of an RO bundle, that is, for example, are obtained by the derivation performed in a certain order. The certain order may be at least one of:
    In the period of time, first in the ascending order of RO in the time domain, and then in the ascending order of RO in the frequency domain; in particular, in the ascending order of RO in the time domain described above may be first in the ascending order of RO of a RACH slot, second in the ascending order of RO in the frequency domain, and then in the ascending order of the RACH slot. In accordance with the time domain first mapping manner, it may be possible to allow UEs that do not have multiple antenna panels—that is, UEs that can only transmit one analog beam at a same time—to try multiple different beam directions in one random access signal transmission (that is, transmission on multiple ROs in one RO bundle). In this way, a certain repetitive gain (to achieve coverage enhancement) can be obtained, and the number of beams that can be selected for one transmission can be increased to try more beam directions, which is advantageous to cope with mobility and increase the access probability;
    In the period of time, first in the ascending order of RO in the frequency domain, and then in the ascending order of RO in the time domain. The frequency domain first manner allows UEs having multiple antenna panels to use multiple beam directions for transmission at a same time. In this way, a certain repetitive gain (to achieve coverage enhancement) can be obtained, and the number of beams that can be selected for one transmission at a same time can be increased to try more beam directions, which is advantageous to cope with mobility and increase the access probability.

Embodiments are described above with reference to FIG. 5, by using the above-mentioned PRACH transmission occasion bundle configuration. The UE can obtain the advantageous effects of coping with mobility and increasing the access probability.

Figure 6:
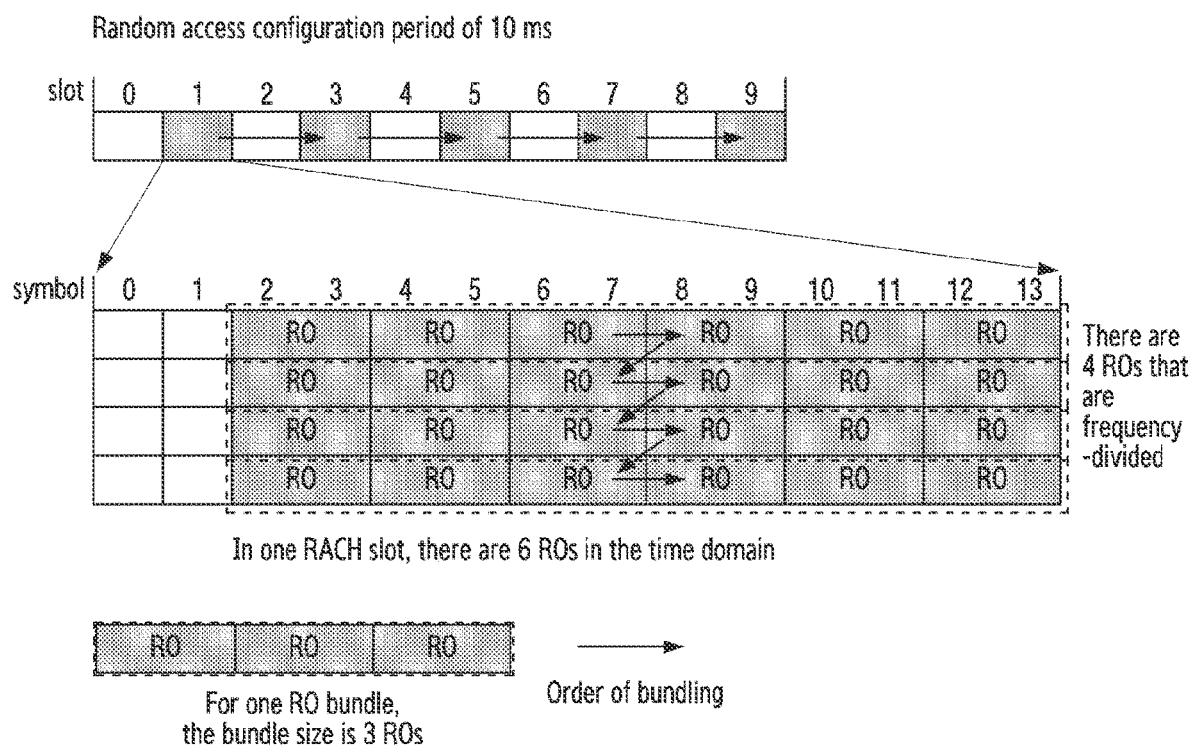
FIG. 6 illustrates an example configuration of a PRACH transmission occasion bundle according to an embodiment.

FIG. 6 illustrates an example configuration of PRACH transmission occasion bundle according to an embodiment. The embodiment shown in FIG. 6 is obtained by expanding the embodiment described in FIG. 5. The detailed description will be given below with reference to FIG. 6.

In FIG. 6, for example, the number of ROs that are frequency-divided is 4; the size of the RO bundle is 3 and the bundle is performed in a time domain first manner. The order of bundle is as follows: first in the ascending order of RO in a RACH slot, second in the ascending order of RO in the frequency domain, and then in the ascending order of the RACH slot. As shown in FIG. 6, for the ROs in slot 1, the bundle is performed in a manner that 3 ROs are bundled as one bundle, and 8 RO bundles are obtained. After the bundles in slot 1 are completed, a similar operation is performed on ROs in slot 3 in the ascending order of the RACH slot.

In particular, in RO bundle performed in a time domain first manner, when two ROs are not continuous (that is, there are X time domain units spaced between two ROs, for example, X OFDM symbols), the UE can perform one or more combinations of the following operations:
  RO bundle operation is not performed for discontinuous ROs;
  When X is less than (or not greater than) a fixed, or pre-configured or base station-configured threshold Y, the UE can continuously bundle the two ROs together, that is, they are included in the same RO bundle; otherwise, the UE does not bundle these two ROs together;
  The case of discontinuity may be a discontinuity directly caused by configuration reasons, and/or a case where the valid ROs resulting from the validity determination are discontinuous; that is, the processing for discontinuous ROs can be extended to processing for discontinuous valid ROs, which is the same as above processing methods.

By using the above-mentioned bundle method described with reference to FIG. 6, the UE can obtain extended RO bundle in the frequency domain. Thus, it is beneficial for the advantageous effect of coping with the mobility and increasing the access probability.

Figure 7:
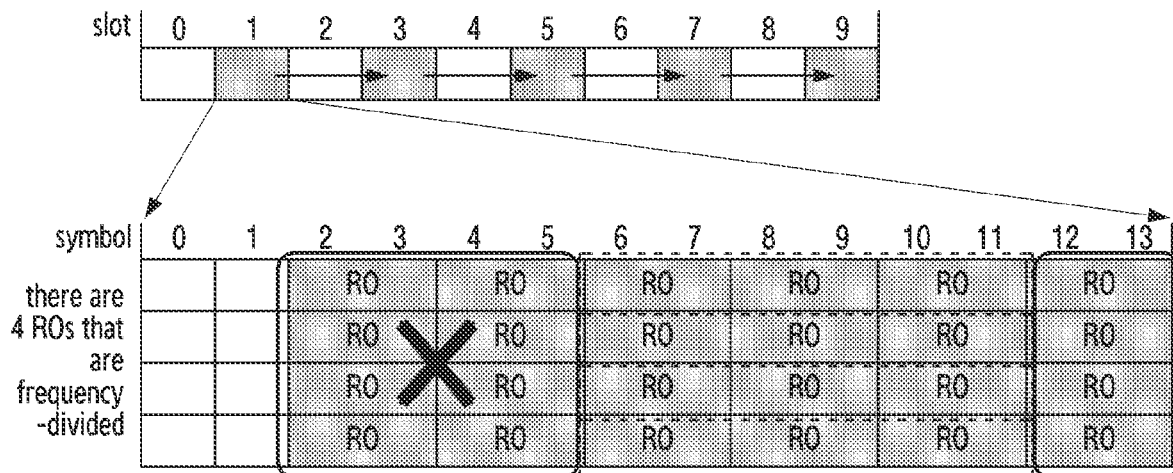
FIG. 7 illustrates an example configuration of a bundle based on valid PRACH transmission occasions according to an embodiment.
Figure 7:
Figure 7:
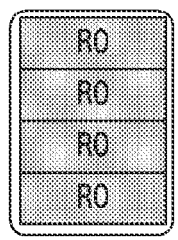
Figure 7:
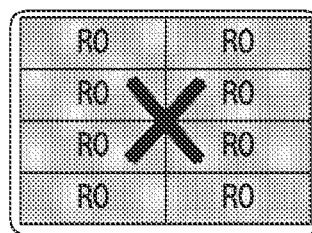

The determination on the validity of the RO will be described below with reference to FIG. 7. FIG. 7 illustrates an example configuration of bundle based on valid PRACH transmission occasions according to an embodiment.

Preferably, after determining the RO bundles based on the configured ROs, the UE may perform the validity determination on the RACH resource based on the resulting RO bundle. The validity determination includes at least one of:
  Validity determination of ROs; RO is determined to be valid when one of the following conditions is satisfied:
    RO is on the UL in the configured UL/DL configuration; or
    RO is after the last symbol of DL in a RACH slot, or after the Ngap symbol which is after the last symbol on the last SSB, wherein the Ngap is the pre-defined number of symbols; or
    Other existing validity determination methods.
  Validity determination of the RO bundles; the RO bundle is determined to be valid when one of the following conditions is satisfied:
    All ROs in the RO bundle are valid; or
    At least one RO in the RO bundle is valid; or
    Not less than (or more than) X ROs in the RO bundle are valid; wherein X is a fixed or pre-configured or base station-configured threshold (a positive integer). In particular, X can represent the required ratio of the valid ROs in the RO bundle, for example ½, which means that at least ½ of ROs in an RO bundle are valid.

Preferably, it can also be based on the manner that the RO bundle is determined by determining the valid RO; that is, the aforementioned bundle size refers to the number of valid ROs in one bundle; the bundle direction of the aforementioned RO bundle is also determined based on the position of the valid RO in the time-frequency domain; as shown in FIG. 7, if the ROs on symbols 2, 3, 4, and 5 are determined to be an invalid RO in the validity determination, that is, there are only 4 valid ROs in one RACH slot in the time domain, then the following RO bundle results as shown in FIG. 7:

If the RO bundle is performed in the time domain first manner, one or more ROs that fail to finish one complete RO bundle in the time domain are the remaining ROs;

If the RO bundle is performed in the frequency domain first manner, one or more ROs that fail to finish one complete RO bundle in the frequency domain are the remaining ROs;

The UE does not use the remaining ROs; and/or does not map the SSB to the remaining ROs.

Preferably, after the valid RO bundle is determined as described above, the UE may perform the mapping between the downlink beam signal and the RACH resource based on the resulting valid RO bundle:

The downlink beam signal may be an SSB, and/or a CSI-RS, and/or PDCCH/PDSCH (DMRS, for example, PDCCH for scheduling SIB1 PDSCH and/or DMRS on PDSCH for transmitting SIB1). The following description is undertaken by taking SSB as an example;

The mapping between the downlink beam signal and the RACH resource may be the SSB to RO bundle mapping. More specifically:

Based on the mapping parameter M configured by the base station, that is, M SSBs can be mapped to one RO bundle;

Starting mapping from the starting point of the aforementioned period of time, that is, the starting point (i.e. SFN 0) of an integer number of SFNs (for example, 2048 SFNs), or the first RO (or RO bundle) of a PRACH slot, or the first RO (or RO bundle) of a random access configuration period, or the first RO (or RO bundle) of each of the SSB-RO mapping, a mapping cycle, an association period, and an association pattern period;

The order of SSB to RO bundle mapping can be:

Time domain first; first, mapping the SSB to the RO bundle in the time domain; then mapping the SSB to the RO bundle in the frequency domain; in particular, it is possible to first map the SSB to the RO bundle in a RACH slot in the time domain; second, mapping the SSB to the RO bundle that is frequency-divided in the frequency domain; and then mapping the SSB to the RO bundle in the next RACH slot;

Frequency domain first; first, mapping the SSB to RO bundle that is frequency-divided in the frequency domain, and then mapping the SSB to the RO bundle in the time domain;

The order of SSB to RO bundles mapping is determined according to the RO bundling order when the RO bundle is determined.

By using the above-mentioned validity determination of RO described with reference to FIG. 7, the UE can obtain a valid RO bundle. Thus, it is beneficial for the advantageous effect of coping with the mobility and increasing the access probability.

FIG. 8 illustrates an example of transmitting a preamble in PRACH transmission occasion bundle according to an embodiment.

In particular, when transmitting the random access signal, it is possible for the UE to transmit it according to the RO bundle, and then it is possible to transmit the preamble on each RO in an RO bundle, then:

The preambles that can be transmitted on each RO are the preambles with the same preamble index, which is equivalent to the case that the UE selects or uses one preamble index in an RO bundle, as shown in (a) in FIG. 8; thus, it is advantageous for the base station to determine that the corresponding same preamble in other ROs in the RO bundle are from the same UE by using the preamble detected in the RO;

The preambles that can be transmitted on each RO are the preambles with different preamble indexes, which is equivalent to the case that the UE selects or uses one preamble index on each RO in an RO bundle, and the preamble index may be different on different ROs, as shown in (b) in FIG. 8. This can increase the total number of preambles that can be selected by each UE, which is advantageous to reducing conflicts with the same UE to a certain extent.

Preferably, the UE determines whether different preambles can be transmitted in one RO bundle through an indication from the base station. For example, the base station informs the UE whether different preamble indexes can be transmitted in the system information through a 1-bit indication; 1 means that different preamble indexes can be transmitted (enable), 0 means that the same preamble index is transmitted (disable), or it is indicated by whether to configure this 1 bit.

According to the method described above with reference to FIG. 8, by using RO bundling to transmit preambles with the same or different preamble indexes, it is beneficial for the advantageous effect of coping with the mobility and increasing the access probability.

Figure 9:
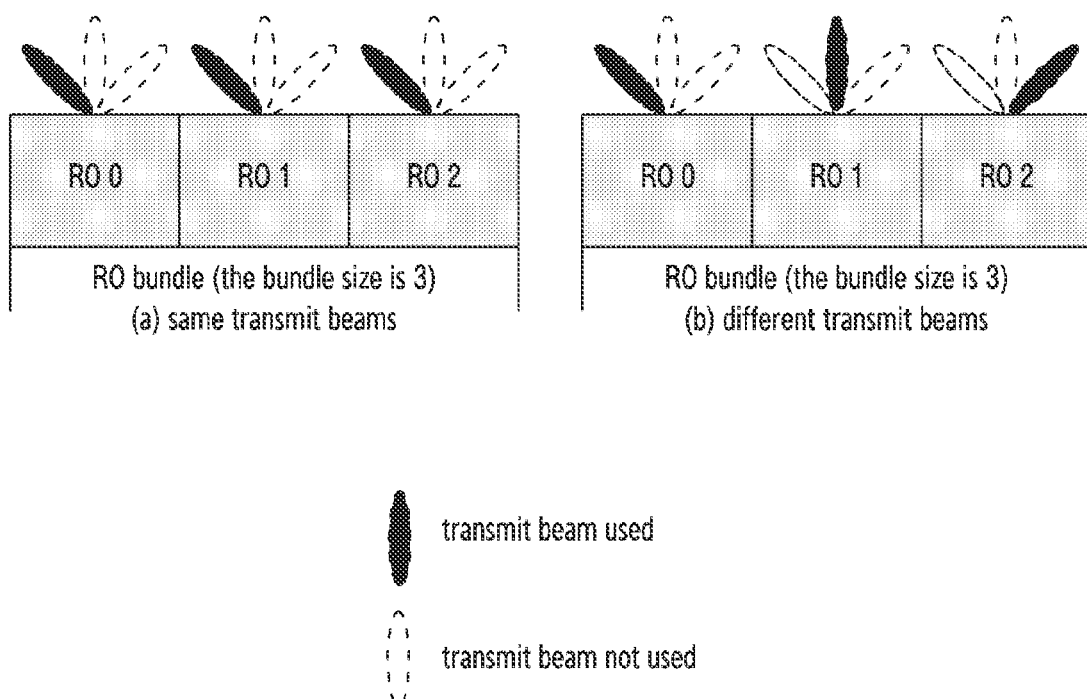
FIG. 9 illustrates an example of transmitting beams in a PRACH transmission occasion bundle according to an embodiment.

FIG. 9 illustrates an example of transmitting beams in PRACH transmission occasion bundle according to an embodiment. When the UE transmits the preamble on the RO bundle, the same beam or different beams can be used for each RO. Specifically:

When transmitting the preamble on each RO in an RO bundle, the same transmit beam is used, as shown in (a) in FIG. 9. This is advantageous for the UE (for example, the UE can determine to transmit beams without aid from the base station) with beam reciprocity to obtain repetitive gain through the RO bundle;

When transmitting the preamble on each RO in an RO bundle, different transmit beams are used, as shown in (b) in FIG. 9. This is advantageous for the UE (for example, the UE can determine to transmit beams with aid from the base station) without beam reciprocity to obtain repetitive gain and multiple-beam gain through the RO bundle, thereby increasing beamforming gain.

Preferably, the UE determines whether different transmit beams can be used in an RO bundle through an indication from the base station. For example, the base station informs the UE in the system information through a 1-bit indication; 1 means that different beams can be used (enable), 0 means that same beams is used (disable), or it is indicated by whether to configure this 1 bit.

According to the method described above with reference to FIG. 9, by using the same or different beams to transmit the preamble, it is beneficial for the advantageous effect of coping with the mobility and increasing the access probability.

Preferably, after transmitting the preamble, the UE will monitor the response from the base station, specifically, including:

The UE will start a random access response monitoring window (RAR window) at the starting position of the first downlink control channel control resource set (CORESET) after N time units which is after the ending position of a specific time, wherein the size of the RAR window is configured by the base station or preset. The specific time may be one of the following:
In the RO bundle in which the UE transmits the preamble;
The last RO in the RO bundle in which the UE transmits the preamble;
The first RO in the RO bundle in which the UE transmits the preamble;
All ROs in the RO bundle in which the UE transmits the preamble; that is, at this time, an RAR window will be started for each RO that transmits the preamble, that is, the UE needs to monitor multiple RAR windows;

When monitoring possible response, whether the scrambling code of the cyclic redundancy check (CRC)_of the detected PDCCH matches an nRA-RNTI is monitored using the nRA-RNTI; if it matches, it means the detected PDCCH is correct, and in turn the content of the DCI is read; if it does not match, the UE continues to monitor in the RAR window until the correct PDCCH is monitored, or the RAR window ends; preferably, the nRA-RNTI results from the calculation performed based on the time-frequency resource position in which the RO bundle is located. More specifically, t_id used to calculate nRA_RNTI includes:
t_id is the index of the first or second OFDM in the first RO of the RO bundle in which it is located over a period of time; or
t_id is the index of the first or second OFDM in the last RO of the RO bundle in which it is located over a period of time; or
t_id is the index of the first or second OFDM in each RO of the RO bundle in which it is located over a period of time; then, at this time, the UE will use multiple nRA-RNTIs for monitoring;
The period of time is as described in the foregoing embodiment, and the description thereof will not be repeated.

In the possible response information, the UE obtains the indicated RO index from the base station, the RO index is an index of one RO in one RO bundle resulting in the order of bundling. For example, the size of one RO bundle is 3, and the order of bundling time-domain first bundling; then the 3 ROs in one RO bundle are RO 0, RO1, RO2. And/or the UE obtains the indicated preamble index (RAPID) from the base station, the RAPID is the preamble index transmitted on the RO. Through the informed RO index and/or the RAPID, during the random access preamble transmission procedure, the UE can obtain an optimal (or better) beam used to transmit the preamble on the RO index.

Preferably, when the UE retransmits the random access signal, it needs to determine whether to perform power ramping up (for example, incrementing a power ramping up counter by 1); in RO bundle-based transmission, if one or more of the following conditions are satisfied, the UE can perform power ramping up:
When the random access signal is retransmitted, the transmit beam used by the UE is the same as the transmit beam used when the random access signal was transmitted last time (including entirely the same and partially the same);
Preferably, when the ratio of the number of different beams to the total number of beams in the last transmission is less than (not greater than) a certain threshold; that is, when the number of different beams is less than (not greater than) a certain threshold;
When the random access signal is retransmitted, the SSB selected by the UE has not changed; when there are multiple selected SSBs, in the retransmitted random access signal, the SSB selected by the UE is the same as the SSB selected when the random access signal was transmitted last time (including entirely the same and partially the same);
Preferably, when the ratio of the number of different SSBs to the number of SSBs in the last transmission is less than (not greater than) a certain threshold; that is, when the number of different SSBs is less than (not greater than) a certain threshold;
Preferably, the above-mentioned SSB can be replaced with other downlink beam reference signals, such as CIS-RS, DMRS, etc.

In this way, the UE can determine the resource used to transmit the random access signal, and can transmit the random access signal.

Preferably, the RO bundle method described above can also be extended to contention-based two-step random access, wherein the first message (msgA) of the two-step random access includes the transmitted preamble and/or PUSCH (data part); wherein, the RO part that transmits the preamble can be in the same way as the aforementioned method, and the description thereof will not be repeated; as for the PUSCH occasion (PO) part that transmits the data part, the process by the UE can include at least one of:
No special bundle processing on the PO. According to the mapping relationship between the preamble and the PUSCH, the UE transmits the PUSCH on the RO in the determined RO bundle and the PUSCH resource corresponding to the preamble;
Corresponding bundling operations on the PO, wherein:
The size of the PO bundle can be configured separately by the base station, or the size of the PO bundle can be determined according to the size of the RO bundle, that is, the same bundle size;
The bundle of the PO is also applied to the valid PO.

Figure 10:
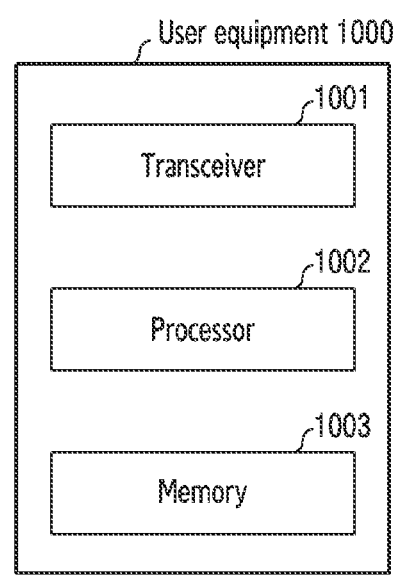
FIG. 10 is a block diagram illustrating a UE according to an embodiment.

FIG. 10 illustrates a block diagram of a user equipment (UE) according to an embodiment of the disclosure.

Referring to FIG. 10, the UE 1000 comprises a transceiver 1001, a processor 1002, and a memory 1003. The transceiver 1001, the processor 1002, and the memory 1003 are configured to perform operations of the UE shown in the drawings (for example, FIGS. 1 to 9) or described above.

The above embodiments are not intended to limit the disclosure, and any modification, equivalent replacement, or improvement made within the spirit and principles of the disclosure shall be included within the protection scope of the disclosure.

Those skilled in the art may understand that the disclosure includes devices involved to perform one or more of the operations described in this disclosure. These devices may be specially designed and manufactured for the required purpose, or may include known devices in general-purpose computers. These devices have computer programs stored therein that are selectively activated or reconstructed. Such computer programs may be stored in readable medium of a device (e.g., a computer) or stored in any type of medium suitable for storing electronic instructions and are respectively coupled to a bus, the computer readable medium includes but not limited to any types of disks (including floppy disks, hard disks, compact disk, CD-ROMs, and magneto-optical disks), ROM, RAM, EPROM (Erasable Programmable Read-Only Memory), EEPROM (Electrically Erasable Programmable Read-Only Memory), flash memory, magnetic card or optical card. That is, a readable medium includes any medium that stores or transmits information in a form readable by a device (e.g., a computer).

Those skilled in the art may understand that computer program instructions may be used to implement each block in these structural diagrams and/or block diagrams and/or flow diagrams and a combination of these structural diagrams and/or block diagrams and/or flow diagrams. Those skilled in the art may understand that these computer program instructions may be provided to a processor of a general purpose computer, a special purpose computer, or other programmable data processing methods to implement, so that the processor of computers or the other programmable data processing methods may execute the scheme specified by a block or multiple blocks of the disclosed structural diagrams and/or block diagrams and/or flow diagrams of the disclosure.

Those skilled in the art may understand that various operations, methods, and steps, measures, and solutions in the processes that have been discussed in the disclosure may be alternated, modified, combined, or removed. Further, other steps, measures, and solutions that include the operations, methods, and processes that have been discussed in this disclosure can also be alternated, modified, rearranged, decomposed, combined, or removed. Further, that various operations, methods, and steps, measures, and solutions in the processes disclosed in this disclosure in the existing art may also be alternated, modified, rearranged, decomposed, combined, or removed.

The above description is only part of the embodiments of the disclosure, it should be noted that for those of ordinary skill in the art, without departing from the principles of the disclosure, improvements and modifications may be made, and these improvements and modifications also should be regarded as the protection scope of the disclosure.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A user equipment (UE) in a wireless communication system, the UE comprising:
  a transceiver; and
  a controller coupled with the transceiver, and configured to:
    receive, from a base station (BS), a synchronization signal and physical broadcasting channel (PBCH) block (SSB),
    receive, from the BS, information configuring a number of a plurality of physical random access channel (PRACH) occasions in a set,
    identify that the plurality of PRACH occasions are associated with a same index of the SSB, and
    transmit, to the BS, a PRACH with preamble repetitions on the plurality of PRACH occasions.

2. The UE of claim 1, wherein a first PRACH occasion among the plurality of PRACH occasions corresponds to a frame number 0 in a time domain.

3. The UE of claim 1,
  wherein at least one set subsequent to the set is determined according to an increasing order in a frequency domain firstly, and an increasing order in a time domain secondly.

4. The UE of claim 1, wherein the plurality of PRACH occasions correspond to a valid PRACH occasion.

5. A base station (BS) in a wireless communication system, the BS comprising:
  a transceiver; and
  a controller coupled with the transceiver, and configured to:
    transmit, to a user equipment (UE), a synchronization signal and physical broadcasting channel (PBCH) block (SSB),
    transmit, to the UE, information configuring a number of a plurality of physical random access channel (PRACH) occasions in a set, and
    receive, from the UE, a PRACH with preamble repetitions on the plurality of PRACH occasions,
  wherein the plurality of PRACH occasions are associated with a same index of the SSB.

6. The BS of claim 5, wherein a first PRACH occasion among the plurality of PRACH occasions corresponds to a frame number 0 in a time domain.

7. The BS of claim 5, wherein
  at least one set subsequent to the set is determined according to an increasing order in a frequency domain firstly, and an increasing order in a time domain secondly.

8. The BS of claim 5, wherein the plurality of PRACH occasions correspond to a valid PRACH occasion.

9. A method performed by a user equipment (UE) in a wireless communication system, the method comprising:
  receiving, from a base station (BS), a synchronization signal and physical broadcasting channel (PBCH) block (SSB);
  receiving, from the BS, information configuring a number of a plurality of physical random access channel (PRACH) occasions in a set;
  identifying that the plurality of PRACH occasions are associated with a same index of the SSB; and
  transmitting, to the BS, a PRACH with preamble repetitions on the plurality of PRACH occasions.

10. The method of claim 9, wherein a first PRACH occasion among the plurality of PRACH occasions corresponds to a frame number 0 in a time domain.

11. The method of claim 9, wherein
  at least one set subsequent to the set is determined according to an increasing order in a frequency domain firstly, and an increasing order in a time domain secondly.

12. The method of claim 9, wherein the plurality of PRACH occasions correspond to a valid PRACH occasion.

13. A method performed by a base station (BS) in a wireless communication system, the method comprising:
  transmitting, to a user equipment (UE), a synchronization signal and physical broadcasting channel (PBCH) block (SSB);
  transmitting, to the UE, information configuring a number of a plurality of physical random access channel (PRACH) occasions in a set; and
  receiving, from the UE, a PRACH with preamble repetitions on the plurality of PRACH occasion, wherein the plurality of PRACH occasions are associated with a same index of the SSB.

14. The method of claim 13, wherein a first PRACH occasion among the plurality of PRACH occasions corresponds to a frame number 0 in a time domain.

15. The method of claim 13, wherein
at least one set subsequent to the set is determined according to an increasing order in a frequency domain firstly, and an increasing order in a time domain secondly.

16. The method of claim 13, wherein the plurality of PRACH occasions correspond to a valid PRACH occasion.

17. The UE of claim 1, wherein the controller is further configured to:
receive, from the BS, random access response, as a response to the transmission of the PRACH with preamble repetitions,
wherein a monitoring window for the random access response starts at a first symbol of an earliest control resource set (CORESET) after a last PRACH occasion among the plurality of PRACH occasions.

18. The UE of claim 1, wherein each of the plurality of random access preambles is associated with a same preamble index.

19. The BS of claim 5, wherein the controller is further configured to:
transmit, to the UE, random access response, as a response to the reception of the PRACH with preamble repetitions,
wherein a monitoring window for the random access response starts at a first symbol of an earliest control resource set (CORESET) after a last PRACH occasion among the plurality of PRACH occasions.

20. The BS of claim 5, wherein each of the plurality of random access preambles is associated with a same preamble index.

21. The method of claim 9, further comprising:
receiving, from the BS, random access response, as a response to the transmission of the PRACH with preamble repetitions,
wherein a monitoring window for the random access response starts at a first symbol of an earliest control resource set (CORESET) after a last PRACH occasion among the plurality of PRACH occasions.

22. The method of claim 9, wherein each of the plurality of random access preambles is associated with a same preamble index.

23. The method of claim 13, further comprising:
transmitting, to the UE, random access response, as a response to the reception of the PRACH with preamble repetitions,
wherein a monitoring window for the random access response starts at a first symbol of an earliest control resource set (CORESET) after a last PRACH occasion among the plurality of PRACH occasions.

24. The method of claim 13, wherein each of the plurality of random access preambles is associated with a same preamble index.

* * * * *